July 17, 1962

J. VICANY 3,044,801

OCCUPANT PROPELLED SHOPPING CART

Filed Oct. 21, 1960

INVENTOR.
JOHN VICANY
BY
McMorrow, Berman & Davidson
ATTORNEYS

July 17, 1962  J. VICANY  3,044,801
OCCUPANT PROPELLED SHOPPING CART
Filed Oct. 21, 1960  2 Sheets-Sheet 2
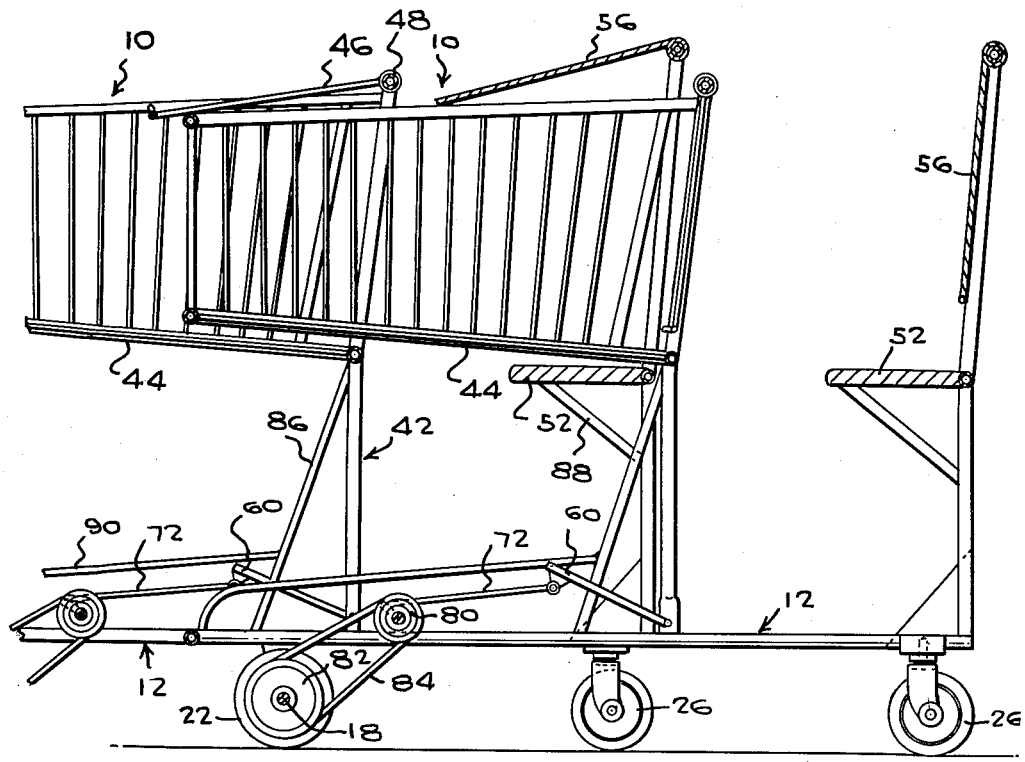
FIG. 3
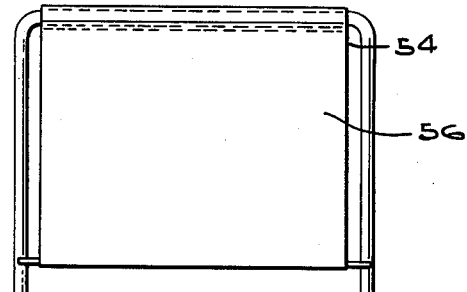
FIG. 4
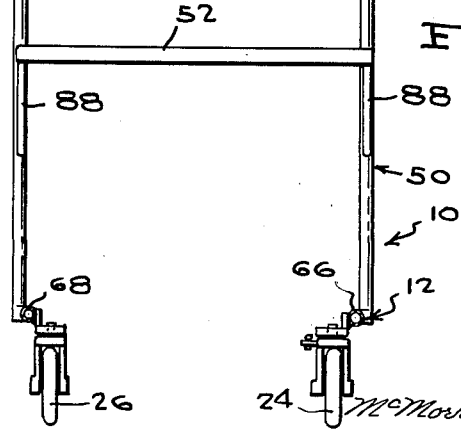
INVENTOR.
JOHN VICANY
BY
McMorrow, Berman & Davidson
ATTORNEYS 3,044,801
OCCUPANT PROPELLED SHOPPING CART
John Vicany, Muscoda, Wis.
Filed Oct. 21, 1960, Ser. No. 64,082
4 Claims. (Cl. 280—202)

The present invention relates to shopping carts of the type commonly employed in grocery stores, supermarkets, and the like.

An object of the present invention is to provide a shopping cart which enables an individual to obtain rest while shopping, thereby influencing the individual to remain longer within the store and to possibly make more purchases.

Another object of the present invention is to provide a shopping cart having a seat upon which an occupant may rest, the seat including a seat back which swings forwardly so as to permit nesting of another cart as is commonly with shopping carts presently in use.

A further object of the present invention is to provide a shopping cart which may be propelled across the floor surface by an occupant of the seat thereof, one which enables a shopper to shop in complete comfort and will efficiency, and one which may be manufactured in quantity at reasonable cost.

These and other objects and advantages of the present invention will be fully apparent from the following description when taken in connection with the annexed drawings, in which:

FIGURE 3 is a side elevational view of the two carts shown in nested condition; and FIGURE 4 is a view taken on the line 4—4 of FIGURE 1.

Figure 1:
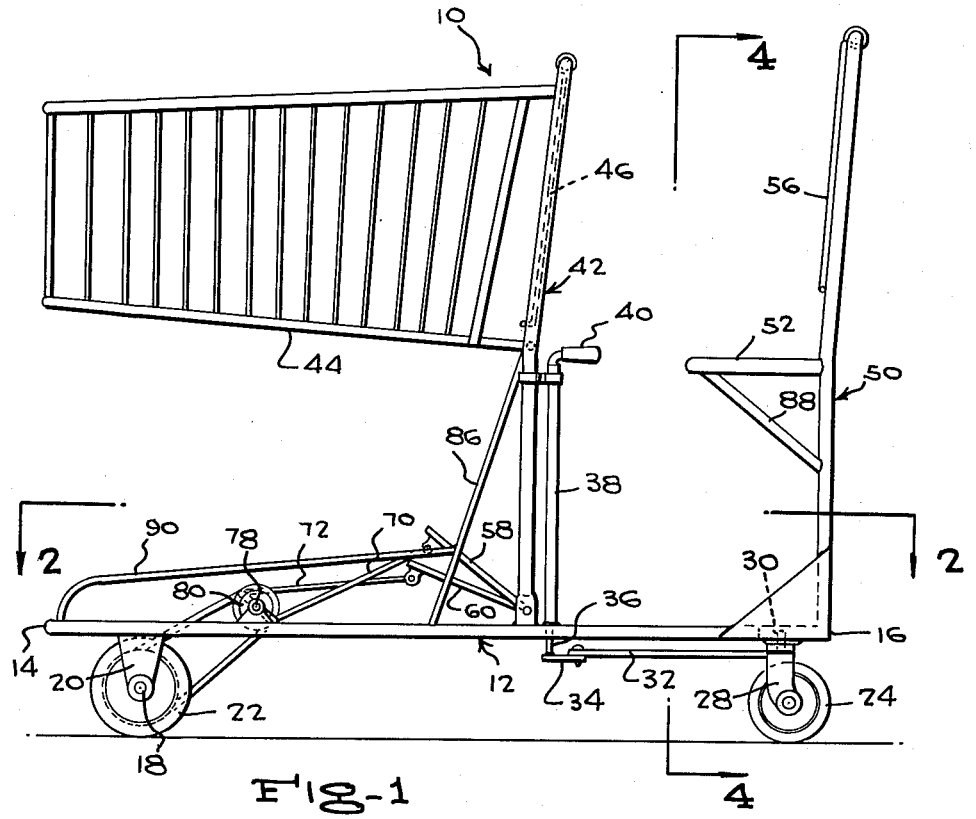
FIGURE 1 is a side elevational view of the shopping cart according to the present invention.

Referring in greater detail to the drawings in which like numerals indicate like parts throughout the several views, a shopping cart is designated generally by the reference numeral 10 and it comprises a horizontally disposed frame 12 having a forward end 14 and a rearward end 16.

A transversely disposed axle 18 is rotatably supported in the forward end of the frame 12 on the lower ends of upright brackets 20 which have their upper ends welded to the underside of the frame 12.

A first pair of laterally spaced ground-engaging wheels 22 are carried on the axle 18 inwardly of the ends thereof and support the forward end of the frame 12 for rolling movement over a floor surface.

A second pair of laterally spaced wheels 24 and 26 are positioned beneath the rearward end 16 of the frame 12 and support the rearward end 16 of the frame 12. The wheel 24 is mounted in the frame 12 so as to constitute a steerable wheel and the other wheel 26 is supported from the frame 12 for castering movement.

The wheel 24 is mounted in a bifurcated bracket 28 which is pivotally connected to the rearward end portion of the frame 12 for swinging movement about a pivot pin 30 shown in dotted lines in FIGURE 1. To one side of the bracket 28 is pivotally connected a pitman arm 32 which has its other end connected to the free end of a horizontally disposed arm 34 carried on the lower end of a vertically disposed shaft 36 rotatably mounted within a tube 38 arranged vertically and carried by the frame 12.

The upper end portion of the shaft 36 is bent rearwardly and provided with a handle 40. The shaft 36, arm 34, pitman arm 32, and bracket 28 constitute steering means operatively connected to the steerable wheel 24 and operable by an occupant or user of the cart 10.

An upright 42 rises from the frame 12 intermediate the forward end 14 and rearward end 16. A basket 44 is positioned above the frame 12 between the upright 42 and forward end 14 of the frame 12 and is supported from the upright 42. A basket 44 has its rear wall 46 dependingly and swingably connected from the bight 48 of the upright 42 which is of inverted U-shape.

Another inverted U-shaped upright 50 (FIGURE 4) rises from the rearward end 16 of the frame 12 and carries a seat 52 intermediate the upper and lower ends thereof. The seat 52 is positioned between the upright 42 and the rearward end 16 of the frame 12.

The bight 54 of the upright 50 swingably and dependingly carries a seat back 56.

In FIGURE 3, the seat back 56 of one cart 10 is shown in a position swung forwardly and upwardly to permit the basket 44 of a second cart 10 to be inserted through the open end of the basket 44 of the first cart.

Pedal actuable drive means is provided on the frame 12 for enabling an occupant of the seat 52 to propel the cart 10 over a floor surface. Specifically, this drive means consists in a pair of pedals 58 and 60 arranged longitudinally of the frame 12 and having their rearward ends rockably supported upon pins 62 and 64, respectively.

The pins 62 and 64 project inwardly from the frame side pieces 66 and 68, respectively.

To the forward ends of the pedals 58 and 60 are connected one ends of connecting rods 70 and 72, respectively. The other ends of the connecting rods 70 and 72 are connected to the throws 74 and 76 of a crank shaft 78 having its end portions journaled in the frame side pieces 66 and 68.

Means is provided drivingly connected the aforesaid drive means to the axle 18. This means consists in a first pulley 80 mounted upon the crankshaft 78 between the throws 74 and 76, a second pulley 82 mounted upon the axle 18 intermediate the ends of the latter, and a flexible belt 84 connecting the pulleys 80 and 82 together.

Braces 86 extend upwardly from each of the frame side pieces 66 and 68 and have their ends secured to the side pieces 66 and 68 and to midparts of the legs of the upright 42, as shown in FIGURE 1. Other braces 88 extend from the legs of the upright 50 to the underside of the seat 52 adjacent each end of the latter and serve to brace the seat 52. Another brace 90 extends rearwardly from the forward end 14 of the frame 12 on each side of the latter and has its rearward end secured to the adjacent brace 86 at a point spaced above the adjacent side piece 66 or 68, as shown most clearly in FIGURES 1 and 2.

Figure 2:
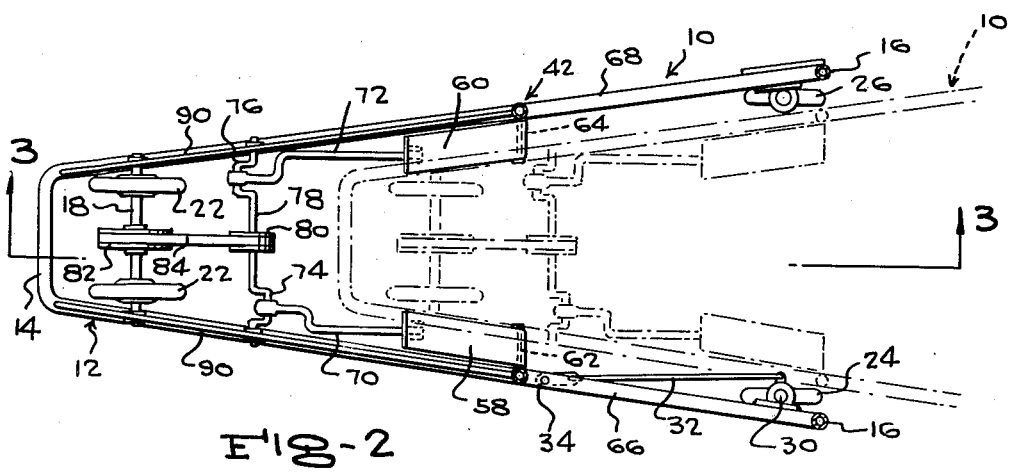
FIGURE 2 is a view taken on the line 2—2 of FIGURE 1, a second cart nested within the cart shown in FIGURE 1 being shown in dotted lines.

As shown most clearly in FIGURE 2, the side pieces 66 and 68 of the frame 12 diverge outwardly from the forward end 14 to the rearward end 16 so that the rearward end of the frame 12 is open to permit the nesting therein of the frame of another cart 10, as in FIGURE 3. Also, the back wall 46 on each basket 44 swings upwardly, as in baskets presently in use in supermarkets and the like, and each seat back 56 swings upwardly to permit the entrance thereunder of the basket of the next cart 10. It will be noted that the seat 52 is of such a heighth as to fit under the basket 44 of the cart immediately forward.

In use, the user of the cart 10 may seat herself upon the seat 52 and by means of the handle 40 steer the one wheel 24 while pumping on the pedals 58 and 60 and propelling the cart forwardly or rearwardly as desired. Due to the caster mounting of the other wheel 26 at the rearward end of the frame 12, the wheel 26 will follow in the same direction as the wheel 24 in the conventional manner.

What is claimed is:

1. A shopping cart comprising a horizontally disposed frame having a forward end and a rearward end, a first pair of laterally spaced ground-engaging driving wheels supporting the forward end of said frame, a second pair of laterally spaced ground-engaging wheels supporting the rearward end of said frame, an upright rising from said frame intermediate the forward and rearward ends, a basket positioned above and spaced from said frame between said upright and the forward end of said frame and supported from said upright, a seat for an occupant of said cart positioned between said upright and the rearward end of said frame and carried by said frame, one of said second pair of wheels being mounted on said frame so as to constitute a steerable wheel and the other of said second pair of wheels being supported on said frame for castering movement, drive means on said frame, means drivingly connecting said drive means to said driving wheels, and steering means embodying a vertically-disposed shaft carried by said frame, an arm on the lower end of said shaft, and a pitman arm operatively connected to said steerable wheel and operable by an occupant of said seat, said drive means being operable by an occupant of said seat to propel said cart over a ground surface.

2. A shopping cart comprising a horizontally disposed frame having a forward end and a rearward end, a transversely disposed driven axle supported in the forward end of said frame, a first pair of ground-engaging driving wheels carried on said axle and supporting the forward end of said frame, a second pair of laterally spaced ground-engaging wheels supporting the rearward end of said frame, an upright rising from said frame intermediate the forward and rearward ends, a basket positioned above and spaced from said frame between said upright and the forward end of said frame and supported from said upright, a seat for an occupant of said cart positioned between said upright and the rearward end of said frame and carried by said frame, one of said second pair of wheels being mounted on said frame so as to constitute a steerable wheel and the other of said second pair of wheels being supported on said frame for castering movement, pedal actuable drive means on said frame, means drivingly connecting said drive means to said axle, and steering means embodying a vertically-disposed shaft carried by said frame, an arm on the lower end of said shaft, and a pitman arm operatively connected to said steerable wheel and operable by an occupant of said seat, said drive means being operable by an occupant of said seat to propel said cart over a ground surface.

3. A shopping cart comprising a horizontally disposed frame having a forward end and a rearward end, a first pair of laterally spaced ground-engaging driving wheels supporting the forward end of said frame, a second pair of laterally spaced ground-engaging wheels supporting the rearward end of said frame, an upright rising from said frame intermediate the forward and rearward ends, a basket positioned above and spaced from said frame between said upright and the forward end of said frame and supported from said upright, a seat for an occupant of said cart positioned between said upright and the rearward end of said frame and carried by said frame, one of said second pair of wheels being mounted on said frame so as to constitute a steerable wheel and the other of said second pair of wheels being supported on said frame for castering movement, drive means disposed along the sides of said frame, means drivingly connecting said drive means to said driving wheels, and steering means disposed on one side of said frame and operatively connected to said steerable wheel and operable by an occupant of said seat, said drive means being operable by an occupant of said seat to propel said cart over a ground surface, said frame and basket both being open at the rearward end so that said cart and a second cart identical in construction may be arranged in partially nested condition with the second cart having its basket inserted through the open end of said cart basket, and with the forward end of the frame of said second cart inserted through the open rearward end of the frame of the first-mentioned cart.

4. A shopping cart comprising a horizontally disposed frame having a forward end and a rearward end, a first pair of laterally spaced ground-engaging driving wheels supporting the forward end of said frame, a second pair of laterally spaced ground-engaging wheels supporting the rearward end of said frame, an upright rising from said frame intermediate the forward and rearward ends, a basket positioned above and spaced from said frame between said upright and the forward end of said frame and supported from said upright, a seat for an occupant of said cart positioned between said upright and the rearward end of said frame and carried by said frame, a seat back swingably and dependingly supported above said seat, one of said second pair of wheels being mounted on said frame so as to constitute a steerable wheel and the other of said second pair of wheels being supported on said frame for castering movement, drive means disposed along the sides of said frame, means drivingly connecting said drive means to said driving wheels, and steering means disposed on one side of said frame and operatively connected to said steerable wheel and operable by an occupant of said seat, said drive means being operable by an occupant of said seat to propel said cart over a ground surface, said frame and basket both being open at the rearward end so that said cart and a second cart identical in construction may be arranged in partially nested condition with the second cart having its basket inserted through the open end of said cart basket under said seat back when swung upwardly, through the open end of said cart basket, and with the forward end of the frame of said second cart inserted through the open rearward end of the frame of the first-mentioned cart.

References Cited in the file of this patent
UNITED STATES PATENTS

| | | |
|---|---|---|
| 1,180,562 | Beggs | Apr. 25, 1916 |
| 1,585,832 | Doud | May 24, 1926 |
| 2,663,376 | Curley | Dec. 22, 1953 |
| 2,906,542 | Hoedinghaus et al. | Sept. 29, 1959 |